United States Patent
Click, Jr. et al.

(10) Patent No.: US 6,526,570 B1
(45) Date of Patent: *Feb. 25, 2003

(54) FILE PORTABILITY TECHNIQUES

(75) Inventors: Clifford N. Click, Jr., San Jose, CA (US); Christopher A. Vick, San Jose, CA (US); Michael H. Paleczny, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/558,408

(22) Filed: Apr. 24, 2000

Related U.S. Application Data

(63) Continuation of application No. 09/298,327, filed on Apr. 23, 1999, now abandoned.
(60) Provisional application No. 60/130,671, filed on Apr. 23, 1999.

(51) Int. Cl.$^7$ .................................................. G06F 9/45

(52) U.S. Cl. ........................ 717/146; 717/140; 717/147

(58) Field of Search ................................. 717/138–141, 717/147, 146, 148, 153

(56) References Cited

U.S. PATENT DOCUMENTS

| | | | | |
|---|---|---|---|---|
| 5,355,491 A | * | 10/1994 | Lawlor et al. | 717/7 |
| 5,432,937 A | * | 7/1995 | Tevanian et al. | 717/11 |
| 5,590,331 A | * | 12/1996 | Lewis et al. | 717/8 |
| 5,604,905 A | * | 2/1997 | Tevanian et al. | 717/6 |
| 5,768,593 A | * | 6/1998 | Walters et al. | 717/5 |
| 5,812,854 A | * | 9/1998 | Steinmetz et al. | 717/9 |
| 5,835,773 A | * | 11/1998 | Dunn | 717/5 |
| 5,920,721 A | * | 7/1999 | Hunter et al. | 717/5 |
| 6,021,275 A | * | 2/2000 | Horwat | 717/7 |
| 6,286,134 B1 | * | 9/2001 | Click, Jr. et al. | 717/146 |

OTHER PUBLICATIONS

Wazlowski et al., "PRISM–II Compiler and Architecture," Proceedings, IEEE Workshop on FPGAs for Custom Computing Machines, Apr. 5–7, 1993, pp. 9–16.*

Hatcher et al., "Efficient Retargetable Compiler Code Generation," Proceedings, International Conference on Computer Languages, Oct. 9–13, 1998, pp. 25–30.*

Aho et al., "Compilers Principles, Techniques, and Tools," Chapter 11 Want to Write a Compiler?, Mar., 1988, ISBN 0–201–10088–6, pp. 723–732.*

* cited by examiner

*Primary Examiner*—Tuan Q. Dam
(74) *Attorney, Agent, or Firm*—Beyer Weaver & Thomas, LL

(57) ABSTRACT

Systems and methods for building a platform specific compiler in a multi-platform environment are provided. A set of user defined platform dependent compiler architecture descriptors that describe corresponding architectural features of a particular hardware platform dependent compiler are provided. The descriptors are converted into the platform dependent compiler source code which is compiled into platform dependent compiler object code. The platform specific compiler is formed from the platform dependent compiler object code and platform independent compiler object code already provide. During compiler run time an interface mediates the flow of information between the platform dependent compiler object code and the platform independent compiler object code.

16 Claims, 10 Drawing Sheets

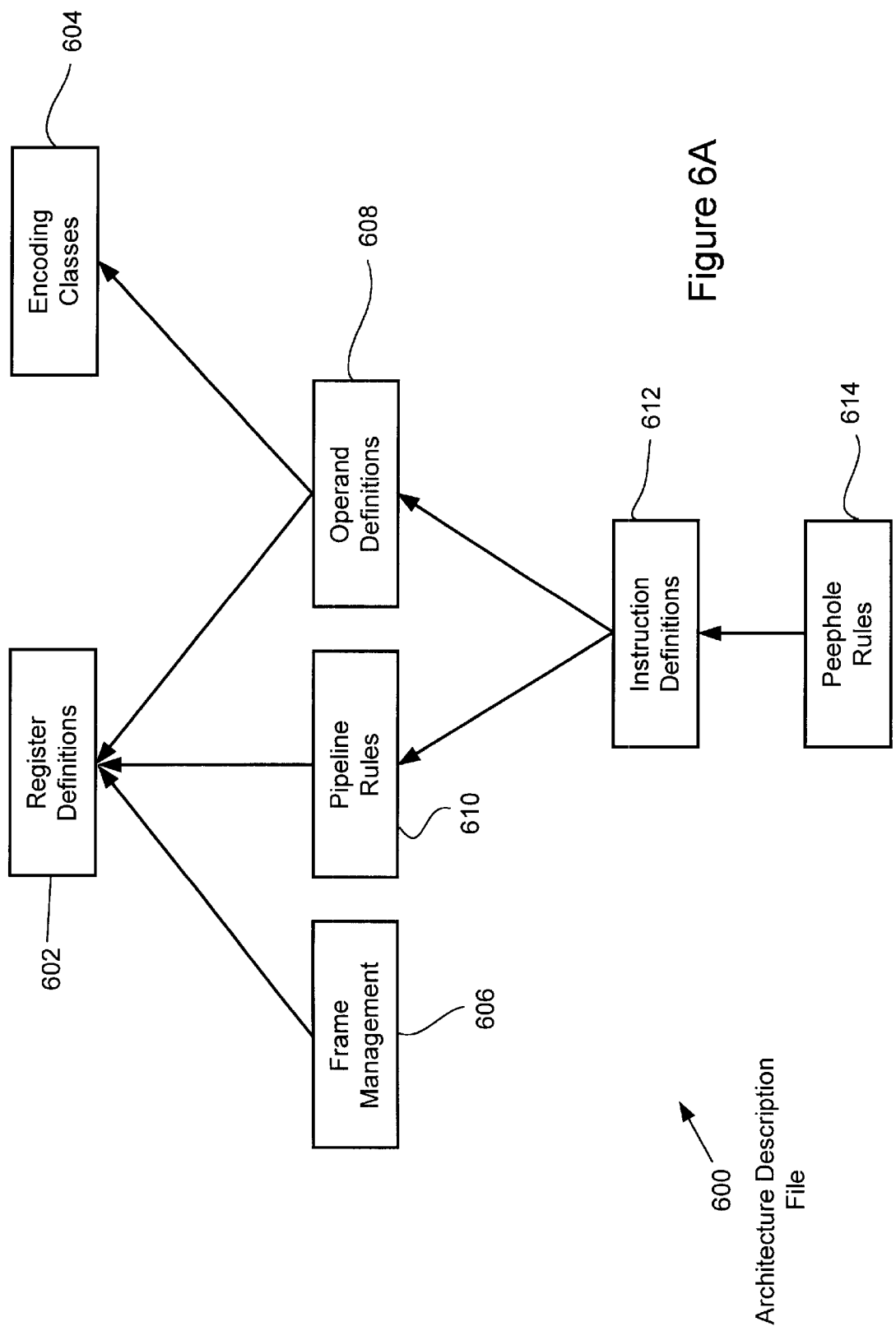

FILE PORTABILITY TECHNIQUES

CROSS REFERENCE TO RELATED APPLICATION

This application claims benefit of priority under 35 U.S.C. §119(e) of (i) U.S. Provisional Application No. 60/130,671 filed Apr. 23, 1999, and entitled "File Portability Techniques" and (ii) is a continuation to U.S. application Ser. No. 09/298,327 filed Apr. 23, 1999, now abandoned, and entitled "File Portability Techniques which are each hereby incorporated by reference in their entireties. This application is also related to (i) U.S. application Ser. No. 09/298,251 filed Apr. 23, 1999, now U.S. Pat. No. 6,285,134, and entitled "Instruction Selection in a Multi-Platform Environment" which is hereby incorporated by reference, and (ii) U.S. application Ser. No. 09/298,637 filed Apr. 23, 1999 and entitled "Automatic Adapter/Stub Generator" which are each hereby incorporated by reference in their entireties.

COMPUTER PROGRAM LISTING APPENDIX

This specification includes a Computer Program Listing Appendix on CD-ROM having 6 files named: sun282appA.txt, created on Apr. 5, 2002, which is 23 kilobytes in size, sun282appB.txt, created on Apr. 5, 2002, which is 22 kilobytes in size; sun282appC.txt, created on Apr. 5, 2002, which is 39 kilobytes in size; sun282appD.txt, created on Apr. 5, 2002, which is 26 kilobytes in size; sun282appE.txt, created on Apr. 5, 2002, which is 39 kilobytes in size; sun282appF.txt, created on Apr. 5, 2002, which is 21 kilobytes in size; and are incorporated herein by reference.

BACKGROUND OF THE INVENTION

1. Field of Invention

The invention relates generally to computer systems. More particularly, methods and apparatus for porting software between different computing platforms are disclosed.

2. Description of Relevant Art

The continuing proliferation of software platforms and hardware architectures ensures that both computer users and computer program developers will encounter many different computing environments in the course of their careers. It should be noted that in the context of this discussion, the term environment refers to the complete range of elements in a computing system that interact with the ported software. These elements typically include a processor and operating system as well as I/O devices, libraries, networks, or, in some cases, a larger human or physical system. Even though a few quasi-standard platforms (e.g. IBM-PC, UNIX) have become widely used there, as yet, is no universal computing environment. In order to maintain and expand their viability, therefore, most software programs will eventually face the need to be ported, such that an executable version of the software program based on the existing version is created in the new computing environment. Portability, or the ability of a software program to be ported to a given environment (i.e., the target) is, therefore, becoming universally recognized as a desirable attribute for most software programs. It is clear, therefore, that portability between different computing platforms enhances the value of a software program both by extending its useful lifecycle and by expanding the range of installations in which it can be readily used. As is well known in the art, a software program can include an application program, a system program, or a component of a program whereas a software system is a collection of software programs.

Porting of a software program is useful to the degree that the cost of porting is less than the cost of rewriting the program in the new target environment. A software program would be perfectly portable if it could be ported at zero cost and, of course, this is never possible in practice. In practice there are two basic portability protocols, the first being binary portability (i.e., porting the executable form of the software program) and the second being source portability (i.e., porting the source language representation of the software program). Although binary portability protocols typically offer several advantages (related primarily to ease of porting) it can only be used to port software programs across strongly similar environments thereby severely limiting its usefulness. In contrast, since source portability protocols assume availability of a source code, they typically provide a greater ability to adapt a particular software program to a wider range of computing environments.

The porting process in general has two principal components referred to as transportation and adaptation. In the context of the porting process, the transportation component is defined primarily as the physical movement of the software program between the various different computing platforms. Although this may seem to be a trivial task, in many cases it is not trivial since compatible media must be used and various types of representation conversions may also be required. On the other hand, the adaptation component is any modification that must be performed on the original version that includes both mechanical translation such as by language processors, and manual modification by humans both of which incur costs in terms of capital equipment and man hours in the form of increased development costs.

In addition to the increase in development costs, there remains the possibility of a reduction in some quality measures of the actual software such as performance, or conformance to system-specific user-interface conventions. However, the corresponding benefits typically take the form of reduced costs to produce and maintain future implementations of the particular software program, as well as possible quality improvements in factors such as reliability.

Unfortunately, most of the porting process is still done by ad hoc methods that result in inefficient techniques that add substantially to the costs of porting software from one platform to another. By way of example, a compiler translates a computer program from one language into another, catching any errors in syntax along the way. Most commonly, a compiler translates some high level language, such as C++ or COBOL, into optimized machine language such that a computer can understand without any translation. In order to fully port a compiler, therefore, several tasks must be accomplished in order for the ported compiler to be able to successfully, and in a highly reliable manner, perform its designed functions while operating in a totally different platform than the one in which it was originally conceived.

The several tasks required to be accomplished in order to fully port a compiler include customization of instruction selection, register allocation, instruction scheduling, instruction peephole optimization, calling conventions, frame layout, runtime issues, instruction encoding, and "clues" for optimization for the different platform. Current compiler porting techniques have only been able to efficiently perform the first four tasks leaving the remaining five tasks for humans to accomplish manually. Typically, in order to accomplish the remaining five tasks requires that anywhere from approximately 30,000 lines of code to as much as 100,000 lines of code must be written by hand which can take up to a full man year to accomplish. This is obviously very inefficient, not cost effective, and leaves the entire porting process prone to error, both human and otherwise.

Therefore, what is desired is the capability of porting software programs, including compilers, from one platform to another different platform in a cost effective and resource efficient manner.

SUMMARY OF THE INVENTION

Broadly speaking, the invention relates to an improved method, apparatus and computer system for efficiently porting a software program, including in one implementation a compiler, from one computing platform to another different computing platform. The invention can be implemented in numerous ways, including as a method, a computer system, an apparatus, and a computer readable medium. Several embodiments of the invention are discussed below.

According to one aspect of the present invention, an apparatus for compiling a platform specific compiler is described. The apparatus includes a set of user defined platform dependent compiler architecture descriptors that describe corresponding architectural features of a particular hardware platform. An architecture descriptor compiler converts the user defined platform dependent compiler architecture descriptors into the platform dependent compiler source code which is converted into platform dependent object code by a host compiler. During run-time for the platform specific compiler, an interface mediates the flow of information between platform dependent compiler object code and platform independent compiler object code.

As a method for building a platform specific compiler, a set of user defined platform dependent compiler architecture descriptors that describe corresponding architectural features of a particular hardware platform dependent compiler are provided. The descriptors are converted into platform dependent compiler source code by an architecture descriptor compiler. The platform dependent compiler source code is compiled into platform dependent object code. The platform specific compiler is formed form the platform dependent object code and platform independent compiler object code already provided.

In another embodiment, a platform specific compiler is disclosed. The compiler includes platform dependent compiler object code and platform independent compiler object code which are suitable for execution on a particular hardware platform. An interface that is partially embedded in the platform independent object code and partially embedded in the platform dependent object code mediates flow of information between the platform independent compiler code and the platform dependent compiler object code during platform specific compiler run time.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which:

FIG. 6A illustrates an exemplary AD file organization in accordance with an embodiment of the invention;

DETAILED DESCRIPTION OF THE EMBODIMENTS

In the following description, frameworks and methods of porting a software program designed to run on an original computing platform to any number of other different computing platforms are described. The invention will initially be described in terms of a compiler residing in a Java virtual machine. In general, in order to port a compiler that was designed to run on a first operating system to a second, different operating system (i.e., also referred to as the target platform), a user defined platform specific architecture descriptors in the form of an architecture description (AD) file is provided. In the described embodiment, the AD file includes all target platform architectural information required to describe the platform specific compiler. The AD file forms an input to a multi-platform compiler that includes an architecture design language compiler (ADLC). In one embodiment, the ADLC is used to generate particular target platform dependent source code used to build the platform specific compiler. The platform specific compiler is built using platform dependent source code provided by the ADLC and target independent source code otherwise provided.

In this way, the amount of manual coding required to define the platform specific compiler is substantially reduced. The multi-platform compiler system in conjunction with the architecture design file particular to a specific target platform substantially reduces the time required to port a compiler from one platform to another different platform by substantially reducing the required use of manual code generation.

Figure 1:
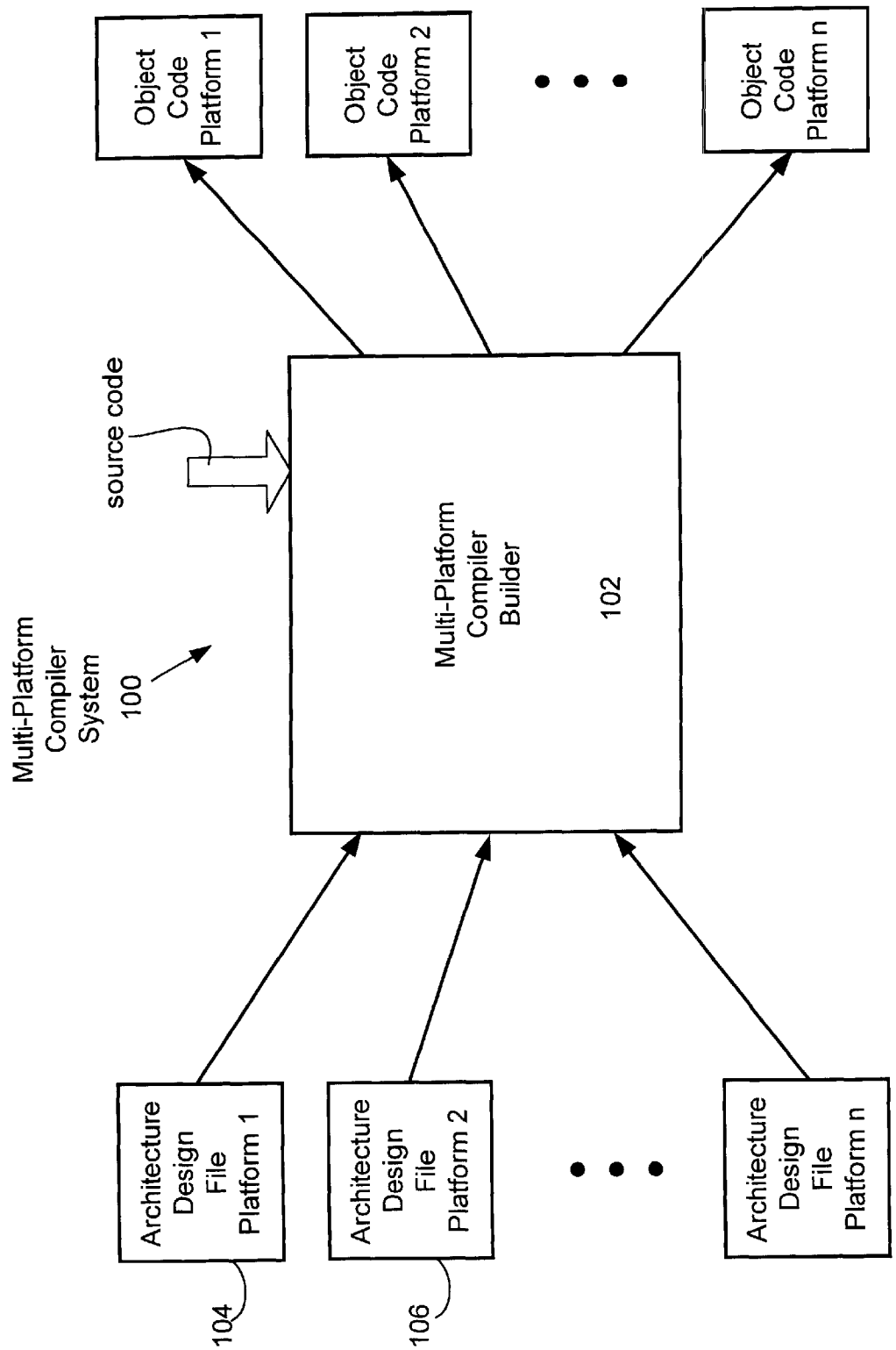
FIG. 1 is a representative block diagram of a multi-platform compiler system in accordance with an embodiment of the invention.

FIG. 1 is a representative compile-time block diagram of a multi-platform compiler system 100 in accordance with an embodiment of the invention. The multi-platform compiler system 100 is capable of building, or compiling, a platform specific compiler capable in itself of compiling source code. Such source code can, and does include, for example, Java source code. In the described embodiment, the platform specific compiler is built by compiling both platform independent source code representing those portions of the platform specific compiler that are independent of any particular platform and platform dependent source code representing those features of the compiler that are platform specific. Typically, the only user supplied coding is that coding used to provide a properly structured AD file.

More particularly, in the described embodiment, the multi-platform compiler system 100 includes a multi-platform compiler builder 102 arranged to build the platform dependent compiler using platform specific architecture descriptors. In the described embodiment, the platform specific architecture descriptors take the form of an architecture description (AD) written in an architecture description language (ADL) used to represent those platform dependent portions of the target platform compiler. It should be noted that the ADL can take many forms well known to those skilled in the art such as C++, Attribute Grammars, Custom Description Languages, etc., or some combination of these forms. Typically, it is the AD file or files that are coded by the user of the multi-platform compiler system 100, however, in some cases, the AD files are provided by original equipment manufacturers in situations referred to as "turn key" systems. In these situations, the end user has selected which target platforms are deemed to be useful and the supplier has provided the necessary coding efforts.

In many instances, the AD files are located in, for example, memory systems external to the multi-platform compiler builder 102 such as an AD file 104 and an AD file 106. It should be that although any number of AD files can be provided, each specific to a particular platform, albeit, only one AD file at a time is processed by the multi-platform compiler builder 102. In this way, when source code specific to, for example, a platform type 1 is provided, the compiler builder 102 is capable of compiling source code into platform type 1 object code. For example, the AD file 104 can include ADL code used by the compiler builder 102 to build an X86 compiler used to compile source code into X86 object code. As well known in the art, X86 object code are those instructions executable by an X86 microprocessor manufactured by the Intel Corporation of Santa Clara, Calif.

Along the same lines, the AD file 106 can include ADL code used by the compiler builder 102 to build, for example, a SPARC compiler used to compile source code into SPARC object code executable by a SPARC microprocessor. As well known in the art, SPARC object code are those instructions executable by an SPARC microprocessor used in computers manufactured by Sun MicroSystems of Mountain View, Calif. In this way, the multi-platform compiler builder 102 is capable of automatically providing as many of the platform specific compilers as there are AD files available. In this way, the manual coding required in order to generate, in these examples, an X86 compiler and a SPARC compiler is greatly reduced since it is essentially limited to the effort used to write the code included in AD files 104 and 106, respectively.

Figure 2:
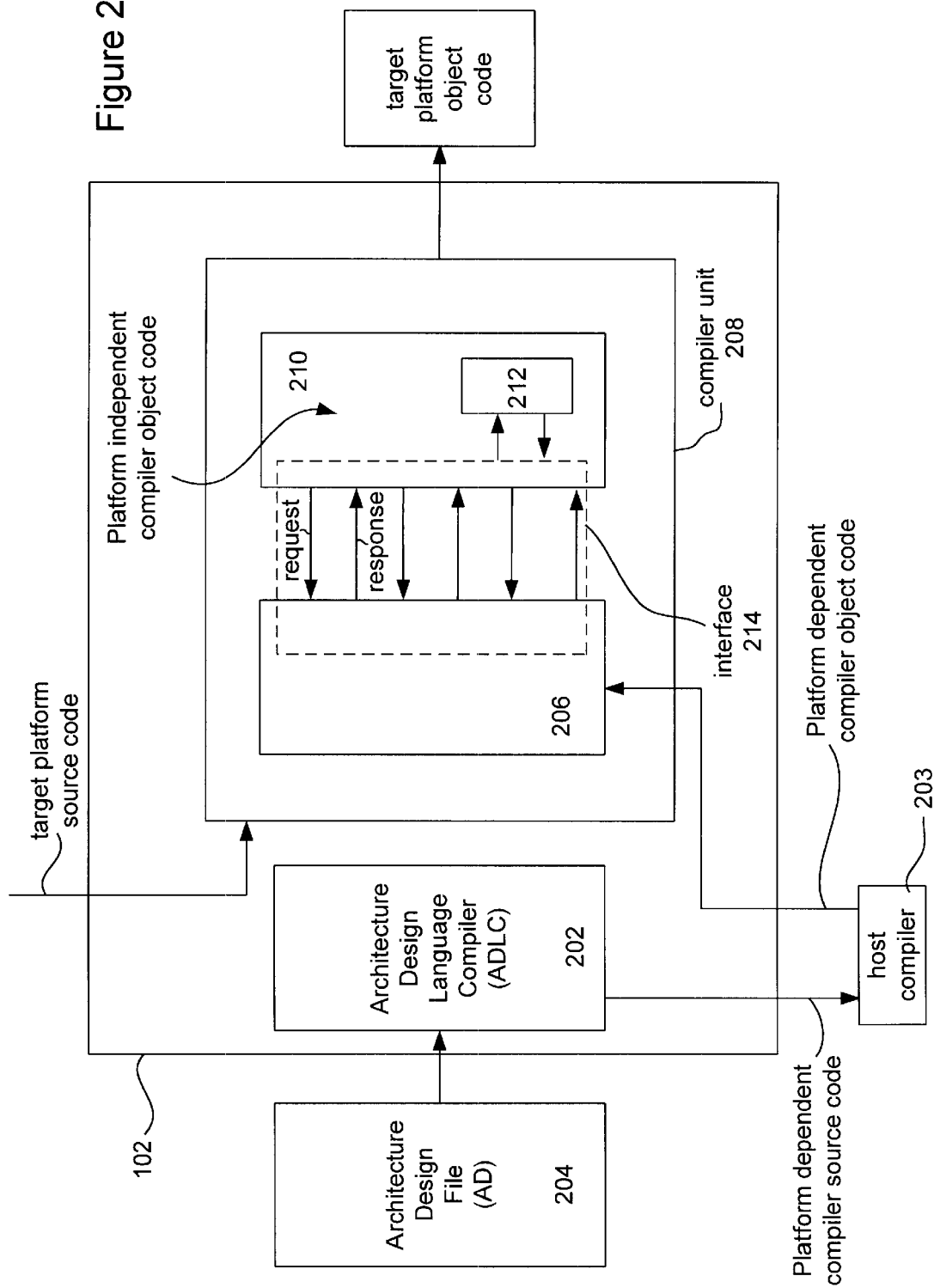
FIG. 2 illustrates a particular implementation of the multi-platform compiler shown in FIG. 1.

Referring now to FIG. 2 illustrating a particular implementation of the multi-platform compiler builder 102 shown in FIG. 1. In the embodiment shown, the compiler builder 102 includes an architecture description language compiler 202 (ADLC) coupled to an AD file 204. The ADLC 202 is arranged to compile the platform specific ADL code included in the AD file 204 into platform dependent compiler source code. The platform dependent compiler source code is, in turn, provided as input to a host compiler 203 coupled to the ADLC 202. In the described embodiment, the host compiler 203 is a C++ compiler well known to those skilled in the art. However, any compiler suitably arranged to compile source code to target specific compiler object code can be used. The host compiler 203 compiles the platform dependent compiler source code provided by the ADLC 202 into platform dependent compiler object code which is stored, or otherwise made accessible, to platform dependent object code block 206 included in a compiler unit 208. The compiler unit 208 also includes platform independent object code representative of the platform independent features common to most compilers. In the described embodiment, the platform independent object code is stored in a platform independent object code block 210. In one embodiment, the platform independent object code block 210 is a compilation engine 212 that communicates with a platform independent interface 214. The compilation engine 212 can be embedded within the platform independent compiler object code. In some cases, the platform independent compiler object code is derived from platform independent compiler source code compiled by the host compiler 203. In other cases, such as the described embodiment, the platform independent compiler object code is already provided.

During run time (execution), the platform independent compiler object code, interacts with the platform dependent compiler object code to operate (i.e., compile) in a target dependent manner. In a particular implementation during runtime, the interface 214 mediates the flow of information between selected portions of the platform dependent object code and the compilation engine 212.

By way of example, when an X86 microprocessor is required, the user provides, for this example, the AD file 204 having stored therein the appropriate ADL code specific to the X86 platform. The AD file 204 then supplies this X86 specific ADL code to the ADLC 202 which converts it to X86 specific compiler source code. It should be noted that the ADLC 202 is a universal compiler capable of compiling any properly constructed AD file in appropriate ADL code into corresponding platform specific compiler source code thereby eliminating any requirements that the user code, or in any way modify the ADLC 202 or any portion thereof. Therefore, the only coding required of the user is that required to provide a properly constructed and verified AD file.

Once the ADLC 202 has converted the X86 specific ADL code to X86 compiler source code, the X86 compiler source code is compiled by the host compiler 203 to form X86 compiler object code that is associated with the code block 206. During run-time, when the compilation engine 212 determines that information from a specific portion of the platform dependent object code is required, the compilation engine 212 issues an information request. In a particular embodiment of the invention, an example of this request is referred to as an emit call that is processed by the interface 214. The interface 214 manages all information transfers between the platform dependent object code in the block 206 and the compilation engine 212 in response to a particular request, such as an emit call.

Figure 3:
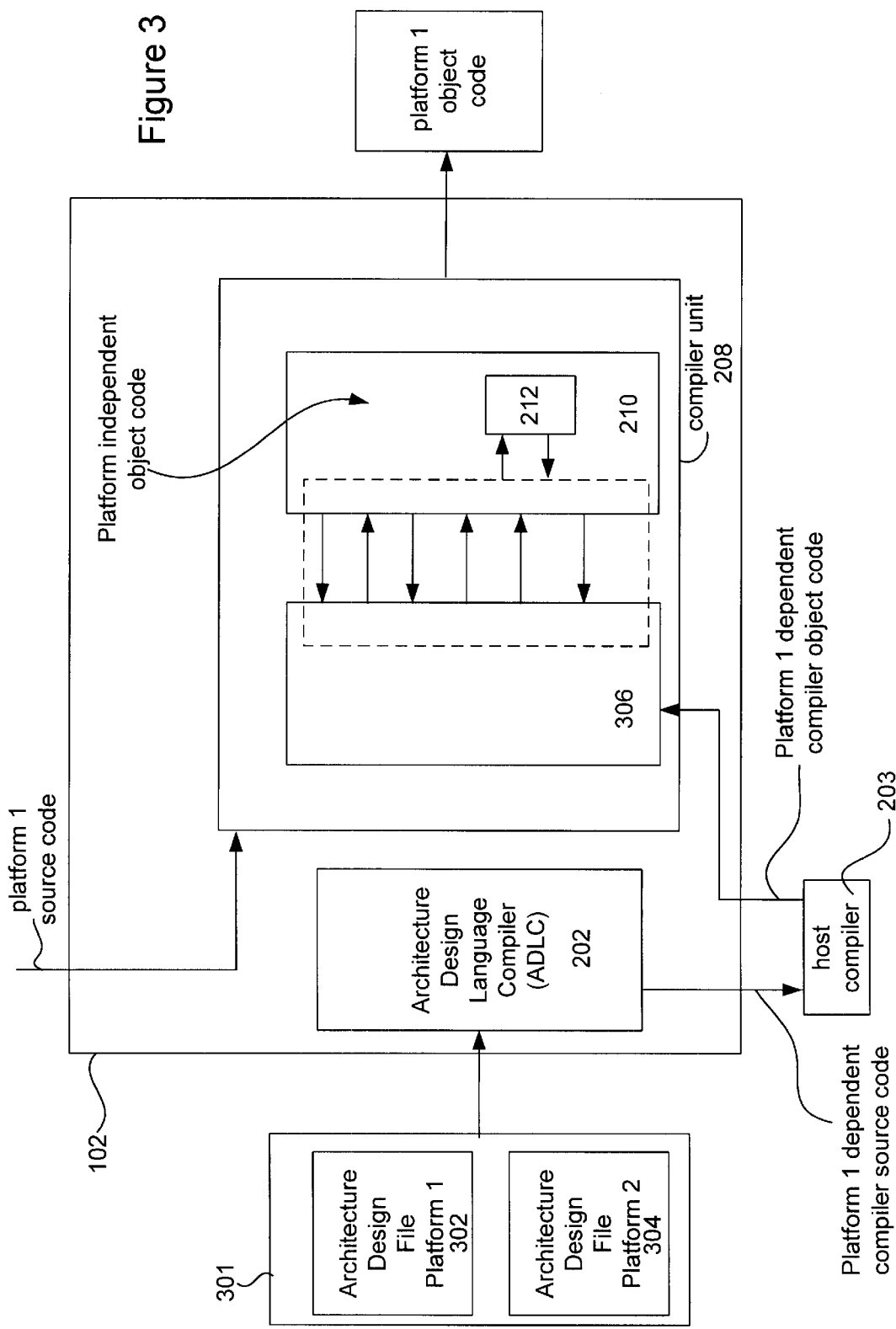
FIG. 3 shows another implementation of the compiler shown in FIG. 2.

In some cases, multiple platform dependent compiler source code files can be compiled into a compiler unit 300 shown in FIG. 3. The compiler unit 300 is one implementation of the compiler unit 208 shown in FIG. 2 and, as such, should only be consider exemplary in nature. In the described embodiment, the various platform dependent AD files are stored in a file stack 301. The file stack 301 can be local to the multi-platform compiler builder 102 or, in some cases, can be remotely located in, for example, databases, remote servers, etc. This arrangement is particularly well suited for applications involving transferring data over coupled computer networks, such as the Internet, local area networks (LANs), and the like. This use of multiple AD files is particularly advantageous since it provides the compiler unit 300 with the capability of operating, as needed, as any platform specific compiler represented by the corresponding AD file. By way of example, the stack file 301 includes platform specific compiler code files 302 and 304 representing, for example, SPARC and X86 operating platforms. A selector unit (not shown) selects, for example, the AD file 302 which is ultimately compiled by the host compiler into SPARC object code and stored in a block 306. With this arrangement, any platform having its corresponding AD file included in the file stack 301 can be selected to customize the compiler unit 300.

Figure 4:
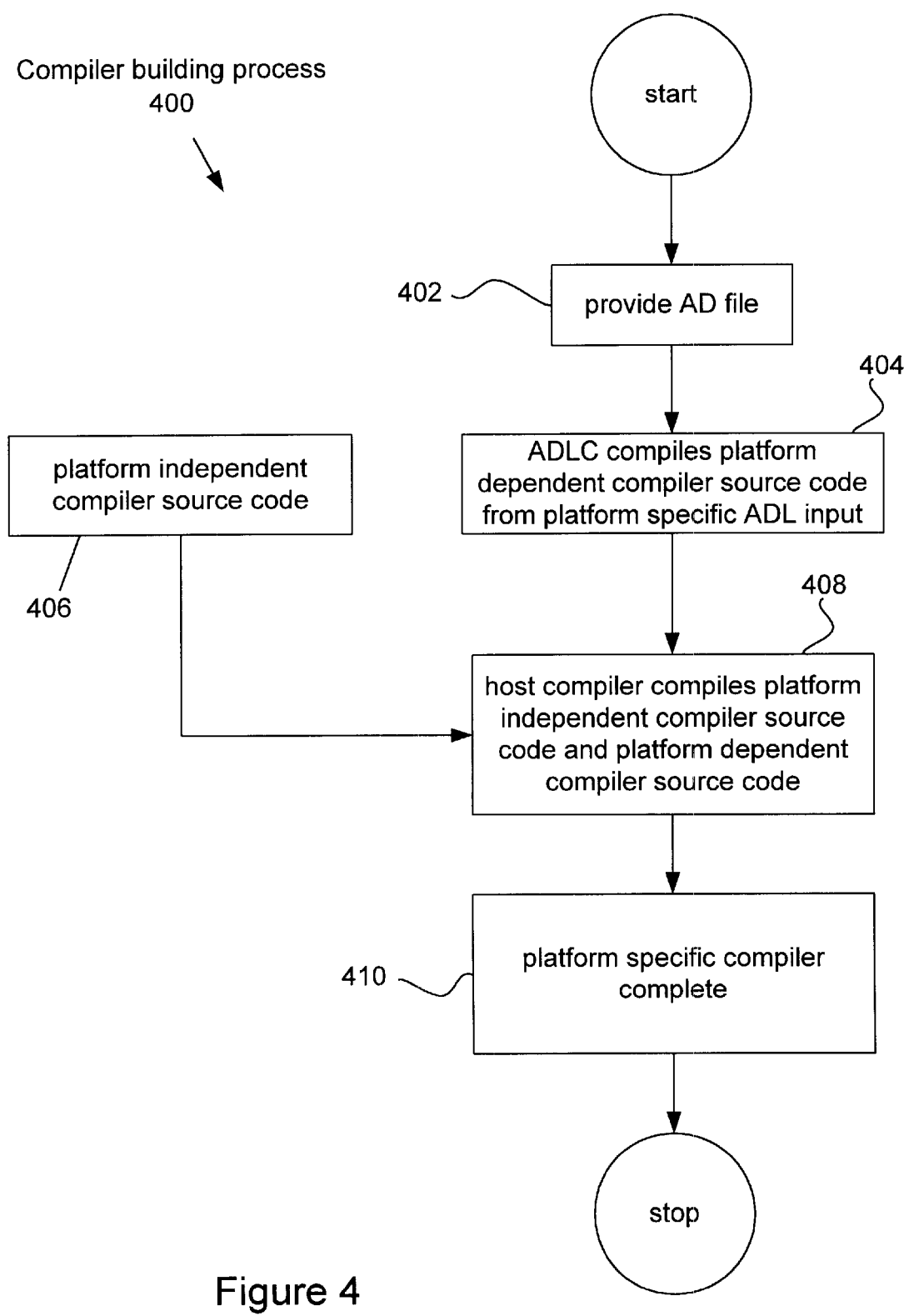
FIG. 4 shows a flowchart detailing a compiler building process in accordance with an embodiment of the invention.

The multi-platform compiler builder 102 builds a particular compiler, using in one embodiment, a process 400 detailed by the flowchart shown in FIG. 4. The process 400 begins at 402 by providing platform specific architecture descriptors in the form of ADL code stored in, for example, an AD file. The ADL code is then passed to an ADLC at 404 which converts the ADL code to platform specific compiler source code. As discussed above, platform independent compiler source code, already provided, is stored in a platform independent compiler source code file at 406. In some embodiments, platform independent compiler object code can be provided. The host compiler then builds the platform dependent compiler by compiling the platform dependent compiler source code concurrently and the platform independent compiler source code at 408. Once the platform specific compiler has been built at 410, the platform specific compiler is available for compiling source code into platform specific object code as needed. In a particular embodiment, during run-time, a platform independent interface partially embedded in both the platform dependent compiler object code and the platform independent compiler object code mediates the flow of information between the compilation engine and the platform dependent compiler object code.

More recently, the Java programming language, an object-oriented language, has introduced the possibility of compiling output (called bytecode) that can run on any computer system platform for which a Java virtual machine (or bytecode interpreter) is provided. The Java virtual machine is designed to convert the bytecode into instructions that can be executed by the actual hardware processor. Using this virtual machine, rather than being interpreted one instruction at a time, bytecodes can be recompiled at each particular system platform by, in some cases, a just-in-time (JIT) compiler.

Figure 5:
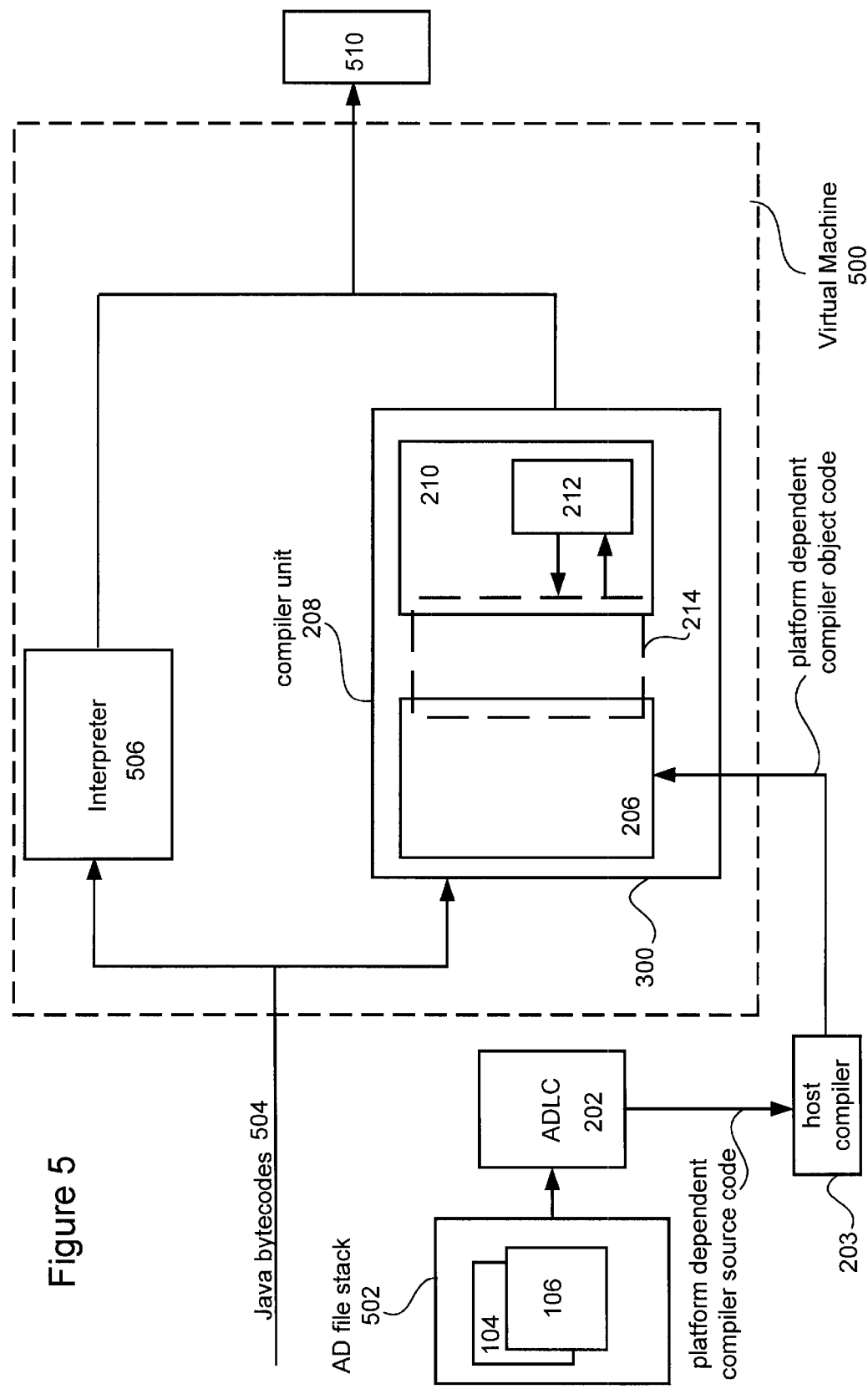
FIG. 5 illustrates a Java Virtual Machine (JVM) having a platform specific compiler in accordance with an embodiment of the invention.

FIG. 5 illustrates an apparatus that includes a Java Virtual Machine (JVM) 500 incorporating the compiler unit 208 in accordance with an embodiment of the invention. In the described arrangement, a platform specific AD file stack 502 coupled to the ADLC 202 includes a group of AD files each representing particular platform dependent compiler features. In the described embodiment, the AD file stack 502 includes the AD file 104 and AD file 106 representing the X86 and SPARC architectures, respectively. In the case where a number of different AD files are included in the AD file stack 502, a selector unit (not shown) is typically used to select a particular AD file from the AD file stack 502 corresponding to the desired operating platform. When the appropriate AD file is selected, the ADLC 202 converts the ADL code included in the selected AD file into appropriate platform dependent compiler source code as discussed above.

In the Java programming language and environment, a just-in-time (JIT) compiler is a program that turns Java bytecode into instructions that can be sent directly to the processor. After a Java program has been written, the Java source language statements are compiled by the Java compiler into Java bytecode rather than into code that contains instructions that match a particular hardware platform's processor (for example, an Intel Pentium microprocessor or an IBM System/390 processor). The Java bytecode is platform-independent code that can be sent to any platform and run on that platform.

More particularly, when bytecodes are provided to a JIT compiler provided by the compiler 208, the compilation of methods contained in bytecodes 504 is delayed until the methods are about to be executed. When bytecodes 504 are provided to an interpreter 506, bytecodes 504 are read into interpreter 506 one bytecode at a time. Interpreter 506 then performs the operation defined by each bytecode as each bytecode is read into interpreter 506. That is, interpreter 506 "interprets" bytecodes 504, as will be appreciated by those skilled in the art. In general, interpreter 506 processes bytecodes 504 and performs operations associated with bytecodes 504 substantially continuously.

When a method is interpreted, the sequence of bytecodes 504 are directly executed by interpreter 506. If, on the other hand, the method which is invoked is a compiled method which has not been compiled, the platform specific compiler 208 is activated. The compiler 208 then generates machine instructions from bytecodes 504, and the resulting machine-language instructions may be executed directly by the target platform operating system 510. In general, the machine-language instructions are discarded when virtual machine 500 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference.

Figure 6B:
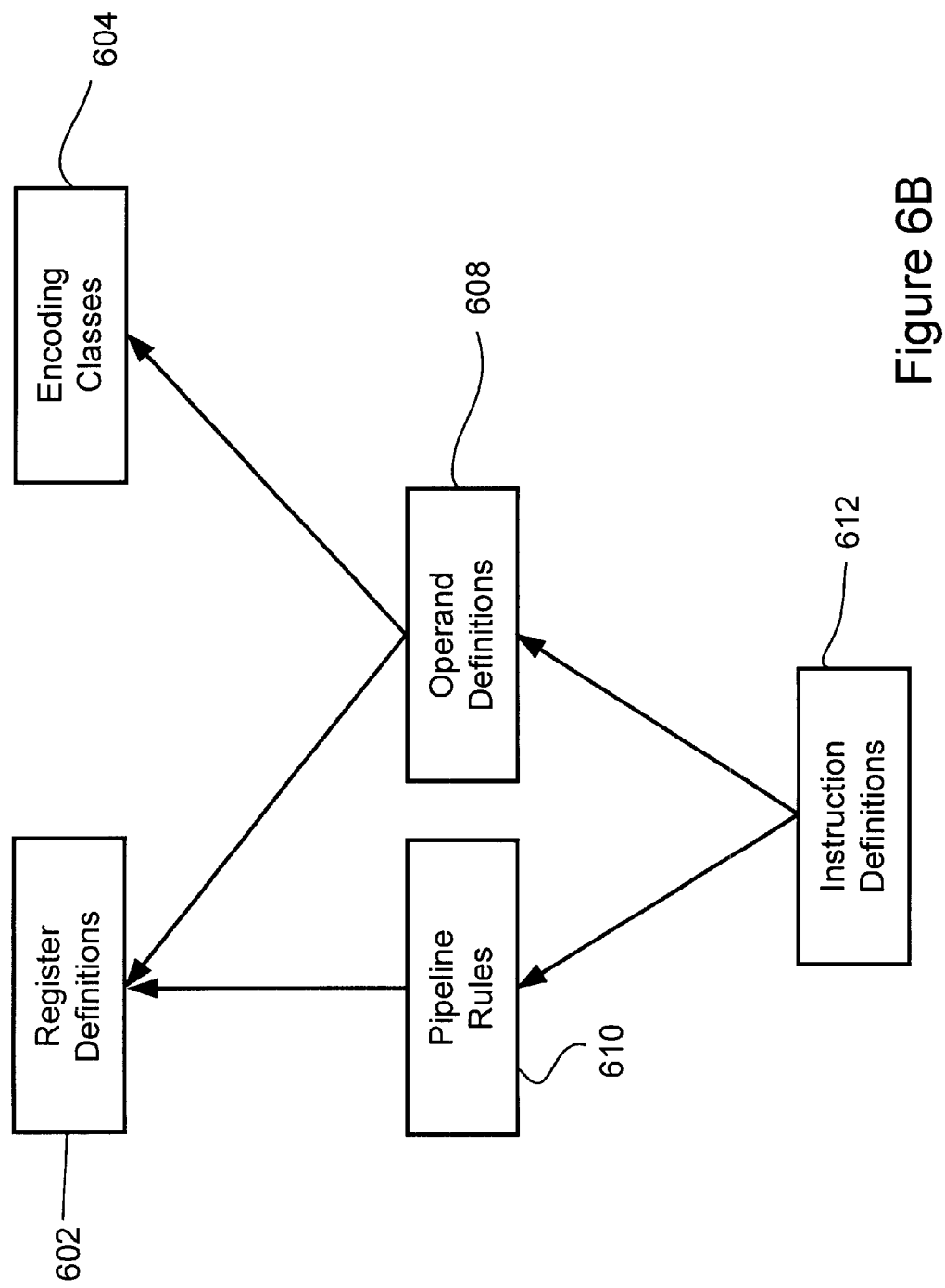
FIG. 6B illustrates a particular relationship between various data fields included in the AD file shown in FIG. 6A.

Referring now to FIGS. 6A and 6B, an organization of an AD file 600 is shown in accordance with an embodiment of the invention. It should be noted that the organization shown is one of the many possible organizations that AD file 104 can take. In the described embodiment, the AD file 600 is a hierarchically organized set of distinct platform architecture descriptor data fields. By way of example, a register definition data field 602 is used by the ADLC to describe individual registers and classes of registers with the target architecture. An encoding block data field 604 specifies the encoding classes used by the target compiler to output byte streams. A frame management block data field 606 includes information that defines the frame structure and management protocols. Such information defines, for example, what direction the frame stack grows, the number of stack slots consumed by a monitor enter operation, stack alignment requirements, number of stack slots reserved for "Top of Stack", amongst others.

An operand data field 608 provides operand definitions that must precede instruction definitions for correct compilation in the ADLC since operands constitute user defined types which are used in instruction definitions. A pipeline rules data field 610 is provided to define the behavior of the target architecture pipeline. An instruction definitions data field 612 provides instruction formats for the target architecture. A peephole data field 614 provides target architecture specific optimization rules used by the ADLC.

The hierarchical organization of the AD file 600 underlies the interrelationship amongst the various ADL input data fields. FIG. 6B graphically illustrates one such relationship, specifically, the relationship between the various operands included in the instruction definitions data field 612. By performing a backwards traversal from using the instruction definitions data field 612 as the root, the relational dependencies for the various operands required to be input to the ADL input data field is determinable. For example, by performing an upward traversal starting from the instruction definition data field 612 as the root and extending upward along the various branches, the pipeline rules data field 610 and operand definitions data field 608 are encountered. Performing an upward traversals from the from the pipeline rules data field 612 is the register definitions data field 602, while the register definitions data field 602 and the encoding class data field 608 are encountered when an upwards traversal from the operand definitions data field 608 is performed. In this way, the various operands required to fully define a particular instruction definition is provided.

Figure 7:
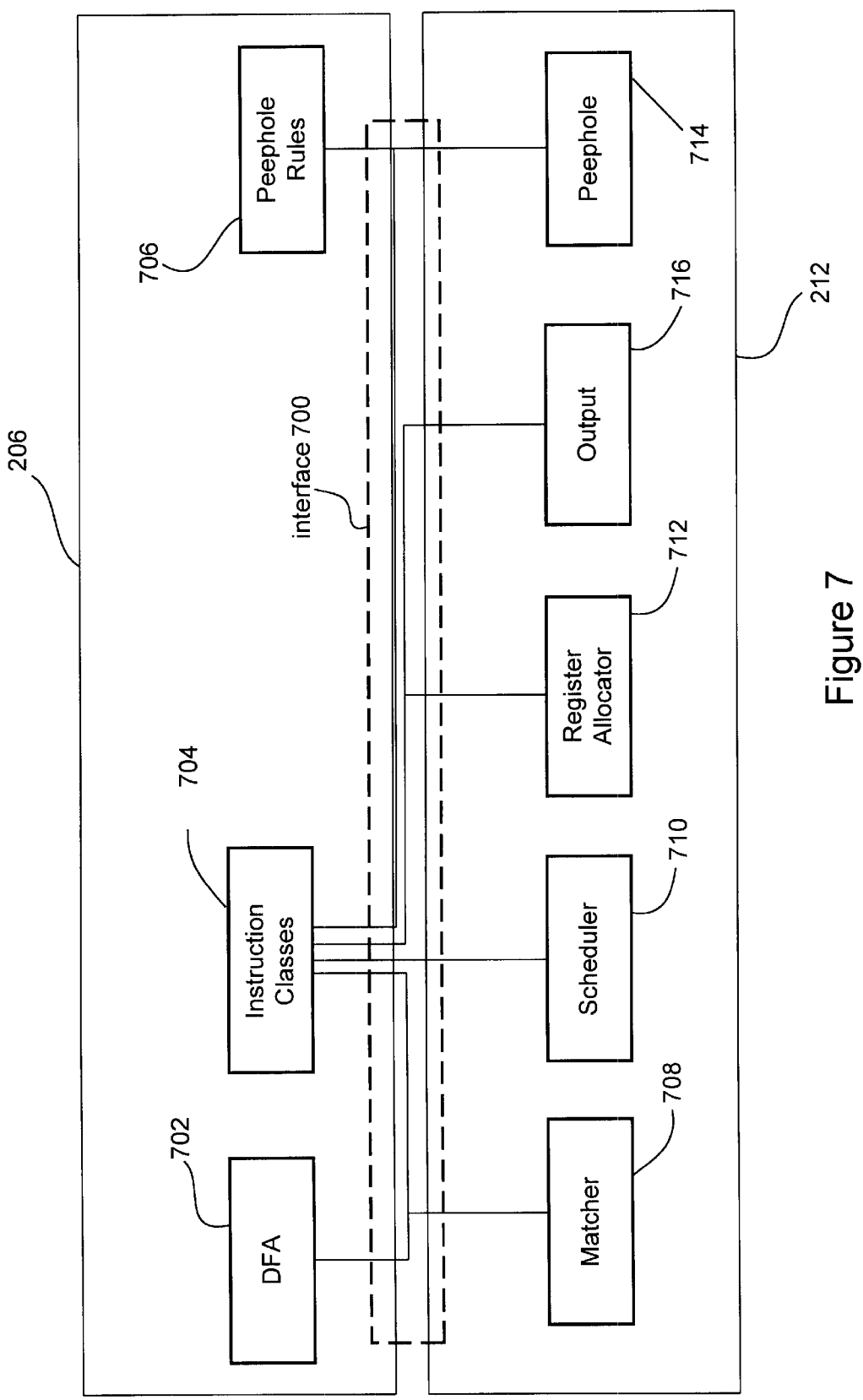
FIG. 7 illustrates an exemplary interface coupling platform dependent source code and platform independent source code in accordance with an embodiment of the invention.

FIG. 7 illustrates an exemplary interface 700 used by the platform dependent compiler in accordance with an embodiment of the invention. The interface 700 mediates communication between the compiler engine 212 (or the platform independent object code) and the platform dependent object code in the block 206. In the embodiment shown, the ADLC output includes source code for a deterministic finite automaton (DFA) 702 that specifies the mapping from ideal operations to machine instructions. The ADLC output also includes source code which defines a set of instruction classes 704 that are used to, for example, define legal register masks, encoding methods, branch offset behavior, etc. Source code for a peephole rules oracle 706 that specifies machine specific trees that are legal to optimize and what the correct replacement is for those trees is also output by the ADLC. In this way, the platform specific architecture characteristics are automatically provided in a format suitable, after processing by the host compiler, for the compilation engine 212 to use in compiling source code into platform dependent object code.

The target independent portion of the interface 700 is coupled to a matcher 708 which generates input trees to be processed by the DFA 702 that performs bottom up rewrite rule system (BURS) style tree pattern matching in order to select machine instructions for ideal operations in the intermediate representation.

The interface 700 also includes object code arrange to act as a peephole DFA that performs tree pattern matching to find optimization candidates and replaces matched trees of machine instructions with optimized trees of machine instructions. A matcher 708 performs instruction selection using the matcher DFA and builds machine specific intermediate representations. A scheduler 710 orders the machine specific intermediate representations while a register allocator 712 selects a legal assignment of registers to operands in the machine specific representation. This includes the insertion of any instructions necessary to relocate values to proper locations (such as moving arguments to their appropriate location specified by the calling convention). A peephole optimizer 714 pattern matches small trees in the machine specific representation and replaces them with more optimal machine specific trees. An object code output 716 uses virtual calls to encode the machine specific representation as machine object code in a buffer and makes the buffer available to the virtual machine.

Figure 8:
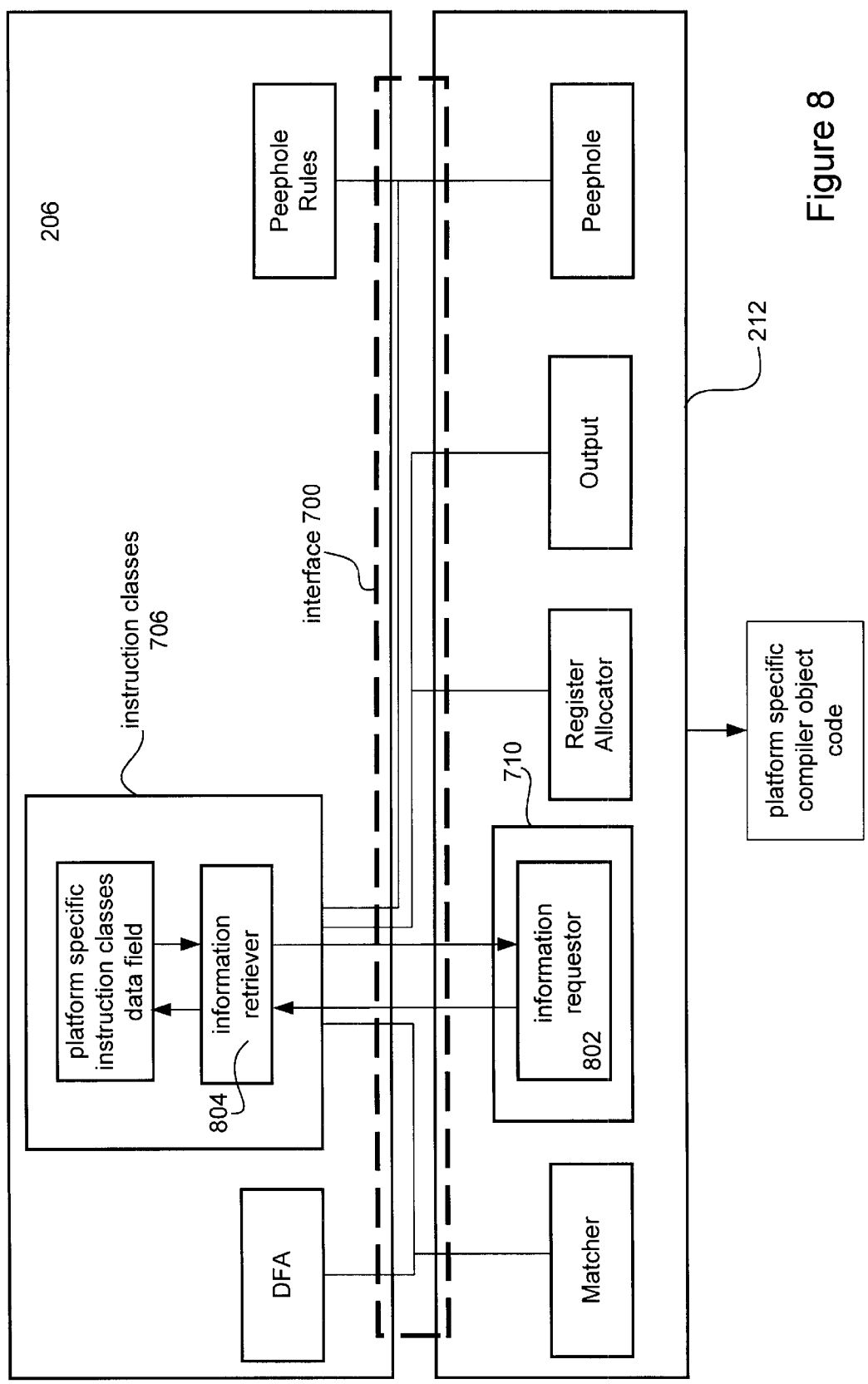
FIG. 8 is an exemplary representation of a platform specific run time process in accordance with an embodiment of the invention.

FIG. 8 is an exemplary representation of a platform specific run time process in accordance with an embodiment of the invention. During the run time process, the compilation engine 212, when required, generates a request (referred to, in a particular embodiment, as an emit function call) for specific information stored in the platform dependent compiler object code block 206 which in a particular embodiment represents the object code of a particular instruction on a particular platform. This request is processed through the interface 700, and results in the execution of platform dependent object code which computes the applicable encoding value, and makes that value available to the compilation engine 212 through the interface 700. The compilation engine 212 then uses the value in a platform independent manner.

By way of example, when the scheduler 710 requires specific information from the instruction class 706, an information requestor 802 sends an emit call to an information retriever 804. In response to the emit call, the information retriever 804 retrieves the specific information which is then returned to the information requestor 802 by way of the interface 700. In this way, any information required by the platform independent object code during run-time is provided using the interface 700 which is itself platform independent.

Figure 9:
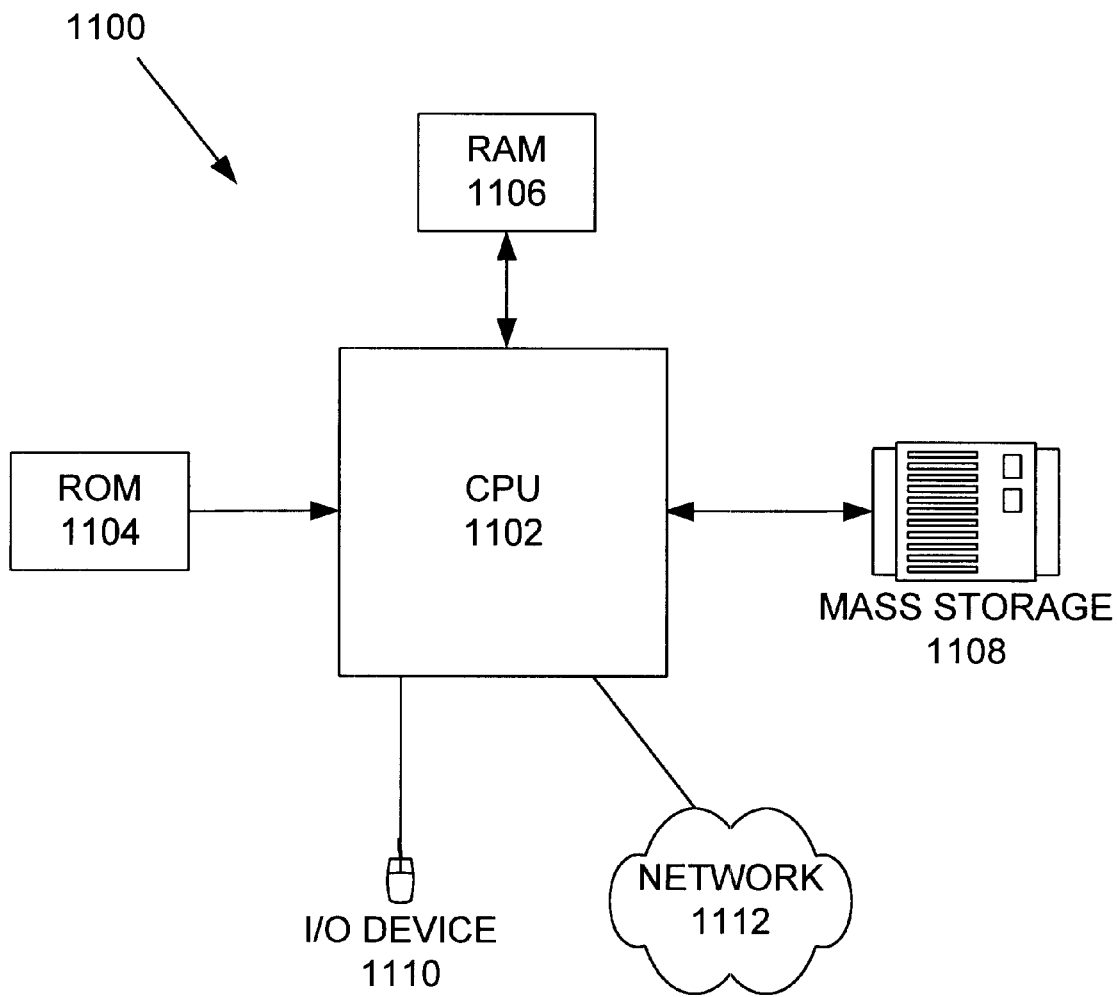
FIG. 9 illustrates a computer system employed to implement the invention.

FIG. 9 illustrates a computer system 900 employed to implement the invention. The computer system 900 or, more specifically, CPUs 902, may be arranged to support a virtual machine, as will be appreciated by those skilled in the art. As is well known in the art, ROM acts to transfer data and instructions uni-directionally to the CPUs 902, while RAM is used typically to transfer data and instructions in a bi-directional manner. CPUs 902 may generally include any number of processors. Both primary storage devices 904, 906 may include any suitable computer-readable media. A secondary storage medium 908, which is typically a mass memory device, is also coupled bi-directionally to CPUs 902 and provides additional data storage capacity. The mass memory device 908 is a computer-readable medium that may be used to store programs including computer code, data, and the like. Typically, mass memory device 908 is a storage medium such as a hard disk or a tape which generally slower than primary storage devices 904, 906. Mass memory storage device 908 may take the form of a magnetic or paper tape reader or some other well-known device. It will be appreciated that the information retained within the mass memory device 908, may, in appropriate cases, be incorporated in standard fashion as part of RAM 906 as virtual memory. A specific primary storage device 904 such as a CD-ROM may also pass data uni-directionally to the CPUs 902.

CPUs 902 are also coupled to one or more input/output devices 910 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 902 optionally may be coupled to a computer or telecommunications network, e.g., an Internet network or an intranet network, using a network connection as shown generally at 912. With such a network connection, it is contemplated that the CPUs 902 might receive information from the network, or might output information to the network in the course of performing the above-described method steps. Such information, which is often represented as a sequence of instructions to be executed using CPUs 902, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the multi-platform compiler can be used in any computing system.

Although the methods of porting a compiler from one operating system to another, different operating system in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

While the present invention has been described as being used with a distributed object based computer system, it should be appreciated that the present invention may generally be implemented on any suitable computing system having a compiler. Therefore, the present examples are to be considered as illustrative and not restrictive, and the invention is not to be limited to the details given herein, but may be modified within the scope of the appended claims along with their full scope of equivalents.

Appendix A is provided illustrating X86 architecture descriptors in accordance with an embodiment of the invention.

Appendix B is provided illustrating platform independent compiler source code in accordance with an embodiment of the invention.

Appendix C is provided illustrating X86 platform dependent compiler source code in accordance with an embodiment of the invention.

Appendix D is provided illustrating SPARC architecture descriptors in accordance with an embodiment of the invention.

Appendix E is provided illustrating platform independent compiler source code in accordance with an embodiment of the invention.

Appendix F is provided illustrating SPARC platform dependent compiler source code in accordance with an embodiment of the invention.

What is claimed is:

1. An apparatus for generating a platform specific compiler, comprising:
   a set of user defined platform dependent compiler architecture descriptors that describe corresponding architectural features of a particular hardware platform dependent compiler;
   an architecture descriptor compiler arranged to convert the user defined platform dependent compiler architecture descriptors into the platform dependent compiler source code;
   a host compiler arranged to compile the platform dependent compiler source code into platform dependent compiler object code;
   platform independent compiler object code; and
   an interface arranged to mediate the flow of information between the platform dependent compiler object code and the platform independent compiler object code during run time for the platform specific compiler.

2. An apparatus as recited in claim 1, wherein the platform specific compiler includes platform independent compiler object code and platform dependent compiler object code suitable for execution of the particular hardware platform.

3. An apparatus as recited in claim 2, wherein during platform specific compiler run time, the platform independent compiler object code requests specific platform dependent object code information by providing an information request to the interface which directs the information request to a pre-determined platform dependent compiler object code information retriever.

4. An apparatus as recited in claim 3, wherein the platform dependent compiler object code information retriever responds to the information request by retrieving specific platform dependent compiler object code information in satisfaction of the information request.

5. An apparatus as recited in claim 4, wherein the retrieved information is provided to the interface which, in turn, directs the information to the information requestor.

6. An apparatus as recited in claim 1, wherein said apparatus comprises a plurality of sets of user defined platform dependent architecture descriptors, wherein each of which corresponds to a different hardware platform.

7. A method of building a platform specific compiler, comprising:
   providing a set of user defined platform dependent compiler architecture descriptors that describe corresponding architectural features of a particular hardware platform dependent compiler;
   converting the set of user defined platform dependent compiler architecture descriptors into platform dependent compiler source code by an architecture descriptor compiler;
   compiling the platform dependent compiler source code into platform dependent object code by a host compiler coupled to the architecture descriptor compiler;
   providing platform independent compiler object code, wherein the platform independent compiler object code and the platform dependent compiler object code are suitable for execution on the particular hardware platform;
   forming the platform specific compiler from the platform dependent compiler object code and the platform independent compiler object code;
   providing an information request to an interface; and
   directing the information request to a pre-determined platform dependent compiler object code information retriever by the interface.

8. A method as recited in claim 7, further comprising:
   requesting specific platform dependent object code information by the platform independent compiler object code by the platform independent object code during platform specific compiler run time.

9. A method as recited in claim 8, further comprising:
   retrieving specific platform dependent compiler object code information in satisfaction of the information request in response to the request by the information retriever.

10. A method as recited in claim 9, further comprising:
    directing the retrieved information to the information requester by the interface.

11. A method as recited in claim 10, further comprising:
    directing the retrieved information to the information requestor by the interface.

12. A platform specific compiler, comprising:
    a platform dependent compiler object code;
    a platform independent compiler object code, wherein the platform independent compiler object code and the platform dependent compiler object code are suitable for execution on a particular hardware platform;
    an interface partially embedded in the platform independent compiler object code and partially embedded in the platform dependent compiler object code, wherein during platform specific compiler run time, the interface mediates flow of information between the platform independent compiler code and the platform dependent compiler code.

13. A platform specific compiler as recited in claim 12, wherein during platform specific compiler run time, the platform independent compiler object code requests specific platform dependent object code information by providing an information request to the interface which directs the information request to a pre-determined platform dependent compiler object code information retriever.

14. A platform specific compiler as recited in claim 13, wherein the platform dependent compiler object code information retriever responds to the information request by retrieving specific platform dependent compiler object code information in satisfaction of the information request.

15. A platform specific compiler as recited in claim 14, wherein the retrieved information is provided to the interface which, in turn, directs the information to the information requester.

16. A platform specific compiler as recited in claim 12, wherein said platform specific compiler further comprises a plurality of sets of user defined platform dependent architecture descriptors, wherein each of which corresponds to a different hardware platform.

* * * * *

UNITED STATES PATENT AND TRADEMARK OFFICE
CERTIFICATE OF CORRECTION

PATENT NO. : 6,526,570 B1  Page 1 of 1
DATED : February 25, 2003
INVENTOR(S) : Click, Jr. et al.

It is certified that error appears in the above-identified patent and that said Letters Patent is hereby corrected as shown below:

<u>Title page,</u>
Delete Item [63] which states:
"Continuation of application No. 09/298,327, filed on April 23, 1999, now abandoned."

<u>Column 1,</u>
Lines 5-18, replace paragraph with the following:
-- The application claims benefit of priority under 35 U.S.C. §119(e) of U.S. Provisonal Application No. 60/130,671 filed April 23, 1999, and entitled "FILE PORTABILITY TECHNIQUES" which is hereby incorporated by reference in its entirety. This application is also related to (i) U.S. Application No. 09/298,251 filed April 23, 1999 and entitled "INSTRUCTION SELECTION IN A MULTI-PLATFORM ENVIRONMENT" which is hereby incorporated by reference (ii) U.S. Application No. 09/298,637 filed April 23, 1999 and entitled "AUTOMATIC ADAPTER/STUB GENERATOR" which is hereby incorporated by reference, and (iii) U.S. Application No. 09/298,327 filed April 23, 1999 and entitled "FILE PORTABILITY TECHNIQUES". --

Signed and Sealed this

Twelfth Day of August, 2003

JAMES E. ROGAN
*Director of the United States Patent and Trademark Office*